US012391092B2

(12) United States Patent
Salter et al.

(10) Patent No.: US 12,391,092 B2
(45) Date of Patent: Aug. 19, 2025

(54) DELIVERY VEHICLE TEMPERATURE MANAGEMENT SYSTEMS AND METHODS

(71) Applicant: Ford Global Technologies, LLC, Dearborn, MI (US)

(72) Inventors: Stuart C. Salter, White Lake, MI (US); Rob Anthony Richardson, Galleywood (GB); Jon Holt, Howell, MI (US); Kyaw Kyaw Soe, Hintlesham (GB); Brendan Diamond, Grosse Pointe, MI (US); Solomon Lin, Fort Wayne, IN (US)

( * ) Notice: Subject to any disclaimer, the term of this patent is extended or adjusted under 35 U.S.C. 154(b) by 265 days.

(21) Appl. No.: 18/327,529

(22) Filed: Jun. 1, 2023

(65) Prior Publication Data
US 2024/0399830 A1 Dec. 5, 2024

(51) Int. Cl.
*B60H 1/00* (2006.01)
*B60P 3/20* (2006.01)
(Continued)

(52) U.S. Cl.
CPC ..... *B60H 1/00735* (2013.01); *B60H 1/00742* (2013.01); *B60H 1/00985* (2013.01);
(Continued)

(58) Field of Classification Search
CPC ............ B60H 1/00985; B60H 1/00742; B60H 1/00771; B60H 1/00735; B60P 3/20;
(Continued)

(56) References Cited

U.S. PATENT DOCUMENTS

2008/0036238 A1\* 2/2008 Weeda ...................... B60P 3/20
296/146.1
2010/0192617 A1\* 8/2010 Chae ....................... F25D 17/08
62/449
(Continued)

FOREIGN PATENT DOCUMENTS

JP 2002071253 A \* 3/2002
JP 6116406 B2 \* 4/2017

OTHER PUBLICATIONS

ATC, Do I Need a Refrigerated Truck for my Business, Oct. 23, 2017, pp. 1-11.

*Primary Examiner* — Donald J Wallace
(74) *Attorney, Agent, or Firm* — Frank Lollo; Eversheds Sutherland (US) LLP

(57) ABSTRACT

A refrigerated delivery vehicle is disclosed. The vehicle may include a refrigerated cargo zone configured to store a plurality of delivery packages. The refrigerated cargo zone may include an access door. The vehicle may further include a detection unit configured to detect a user movement in the refrigerated cargo zone and an access door movement when the vehicle may be traversing a delivery route or parked. The vehicle may further include a processor configured to obtain inputs from the detection unit, and determine a user inefficiency parameter based on the inputs. The processor may be further configured to compare the user inefficiency parameter with a threshold inefficiency parameter. The processor may output a notification instructing the user to reduce the user movement or the access door movement when the user inefficiency parameter may be greater than the threshold inefficiency parameter.

19 Claims, 5 Drawing Sheets

(51) Int. Cl.
 *G07C 5/00* (2006.01)
 *G07C 5/08* (2006.01)
 *G06Q 10/0832* (2023.01)

(52) U.S. Cl.
 CPC ............. *B60P 3/20* (2013.01); *G07C 5/004* (2013.01); *G07C 5/0841* (2013.01); *G06Q 10/0832* (2013.01)

(58) Field of Classification Search
 CPC .. G07C 5/004; G07C 5/0841; G06Q 10/0832; B60Q 9/00; B62D 33/048
 See application file for complete search history.

(56) References Cited

U.S. PATENT DOCUMENTS

| | | | |
|---|---|---|---|
| 2019/0242716 A1 | 8/2019 | N et al. | |
| 2019/0277647 A1 | 9/2019 | Adetola et al. | |
| 2019/0283541 A1 | 9/2019 | Adetola et al. | |
| 2019/0392370 A1* | 12/2019 | Kashi | G07F 17/244 |
| 2020/0132352 A1* | 4/2020 | DeLuca | F25B 49/005 |
| 2020/0207326 A1* | 7/2020 | Wenger | B60H 1/00735 |
| 2020/0284599 A1* | 9/2020 | Cyr | G01C 21/3469 |
| 2021/0279677 A1 | 9/2021 | Beasley et al. | |
| 2022/0299261 A1 | 9/2022 | Salter et al. | |
| 2023/0053315 A1* | 2/2023 | Smith | B62B 3/1404 |
| 2023/0194271 A1* | 6/2023 | Hanchett | B60L 53/62 |
| | | | 701/410 |
| 2023/0304809 A1* | 9/2023 | Schini | G01C 21/3492 |
| 2024/0076039 A1* | 3/2024 | Takahama | B64U 10/13 |
| 2024/0183674 A1* | 6/2024 | Narayanan | B60L 53/68 |
| 2025/0033517 A1* | 1/2025 | Hancock | B60L 53/66 |

\* cited by examiner

DELIVERY VEHICLE TEMPERATURE MANAGEMENT SYSTEMS AND METHODS

FIELD

The present disclosure relates to delivery vehicle temperature management systems and methods and more particularly to systems and methods to facilitate efficient temperature management in a refrigerated delivery vehicle based on delivery personnel actions.

BACKGROUND

Refrigerated cargo trucks or refrigerated tractor trailers are typically used to transport perishable delivery items that may need cold storage temperature. For example, such cargo trucks are used to transport food items, medicines, or other similar items that require cold temperature during transportation.

To ensure that the items stored in a refrigerated zone of a cargo truck do not perish, it is important to maintain a cold/desired temperature in the refrigerated zone. The temperature in the refrigerated zone may increase above the desired temperature when there may be a fault in a cargo truck cooling system, and/or when a vehicle user may be unloading (or loading) delivery items from the refrigerated zone via a refrigerated zone access door. The cargo truck may be required to expend excess energy to cool the temperature in the refrigerated zone back to the desired temperature, when such instances occur. Excess energy usage may affect vehicle performance cause, and hence cause inconvenience to the vehicle user and/or a fleet operator.

Thus, there is a need for system and method to facilitate efficient management of temperature in a refrigerated cargo truck.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
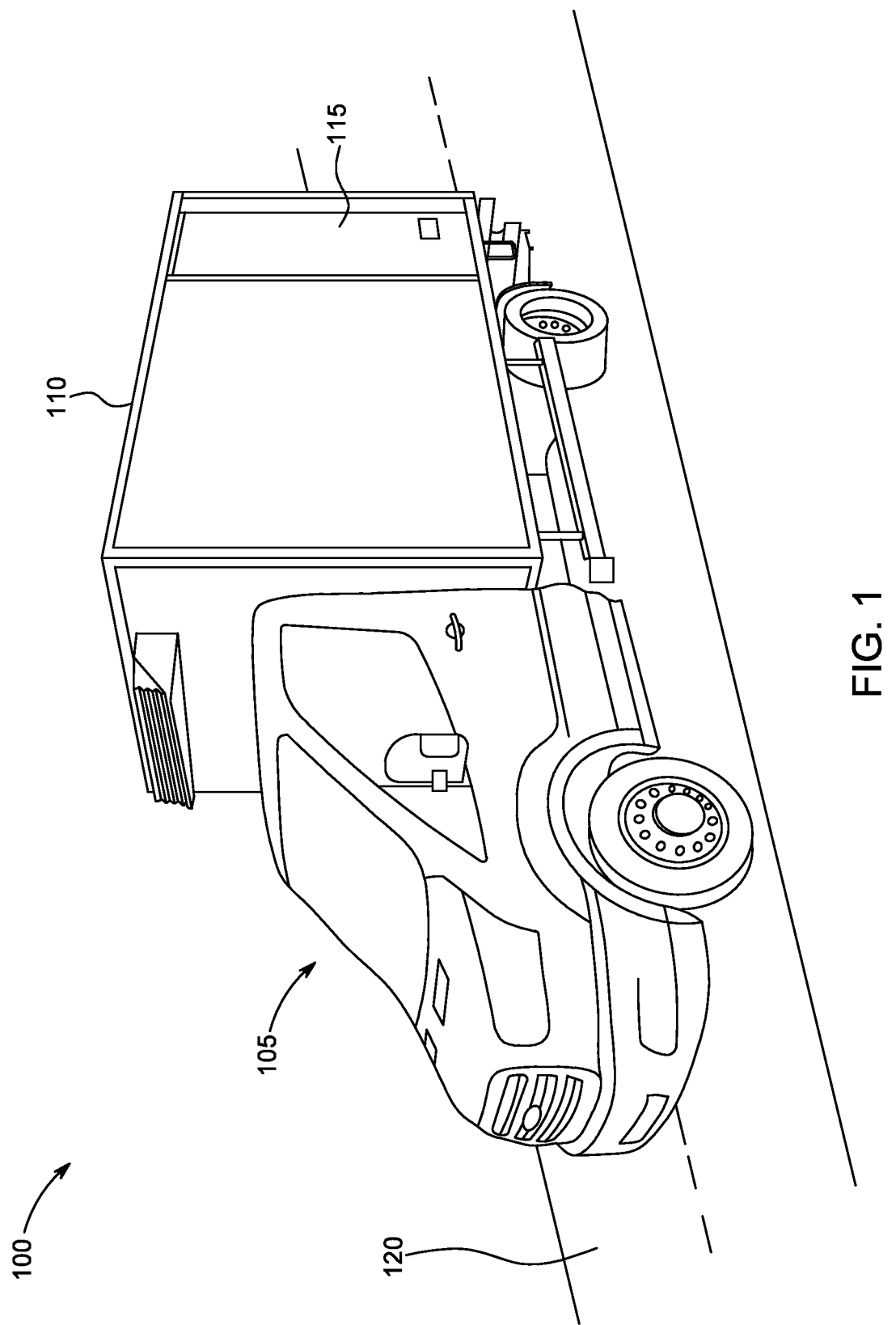
FIG. 1 depicts an example environment in which techniques and structures for providing the systems and methods disclosed herein may be implemented.

The present disclosure describes system and method to facilitate temperature management in a refrigerated delivery vehicle. The vehicle may include a refrigerated cargo zone that may be configured to store a plurality of delivery packages including perishable items such as food products, medicines, and/or the like. The refrigerated cargo zone may include an access door using which a vehicle user may load/unload the delivery packages to/from the refrigerated cargo zone. The system may obtain vehicle information, delivery package information, and delivery route information before the vehicle commences a delivery trip. Responsive to obtaining the information, the system may calculate an energy that may be required by the vehicle to traverse the delivery trip and maintain a desired cool temperature (that may be preset by a fleet operator) in the refrigerated cargo zone based on the obtained information. The system may further compare the calculated energy with an energy level that may be present in the vehicle before the vehicle commences the delivery trip. The system may output a charge notification instructing the vehicle user to charge/refill the vehicle when the energy level present in the vehicle may be less than the calculated energy.

In further aspects, when the vehicle may be traversing the delivery trip or parked during transit, the system may obtain inputs associated with user movement in the refrigerated cargo zone and access door movement from vehicle sensors and/or vehicle interior cameras. The system may further determine a user inefficiency parameter (or user behavior parameter) based on the obtained inputs. The system may then compare the user inefficiency parameter with a threshold inefficiency parameter (that may be pre-set by the fleet operator). The system may output a notification instructing the user to reduce the user movement and/or the access door movement when the system determines that the user inefficiency parameter may be greater than the threshold inefficiency parameter. For example, the system may output the notification when the system determines that the user may be opening the access door frequently or more than a permissible count of times, which may result in loss of cooling in the refrigerated cargo zone. As another example, the system may output the notification when the system determines that the user may be opening the access door for a time duration that may be greater than a permissible time duration.

In some aspects, the system may additionally transmit the notification, and/or inputs associated with the user movement and the access door movement, to a user device or a server associated with the fleet operator. The fleet operation may plan training program(s) and/or rewards for the vehicle user based on the information received from the system.

The system may be additionally configured to recommend modifications in delivery package storage locations in the refrigerated cargo zone based on the inputs associated with the user movement and the access door movement, and the delivery package information. Specifically, the system may recommend modifications in the delivery package storage locations such that user movement in the refrigerated cargo zone and/or the access door movement may be reduced. For example, the system may recommend moving a heavy delivery package closer to or in proximity to the access door, so that the user movement in the refrigerated cargo zone to load/unload such heavy delivery package may be reduced.

The system may be further configured to determine one or more areas in the refrigerated cargo zone that may have non-uniform temperatures, based on inputs obtained from vehicle sensors and/or interior vehicle infrared cameras. The system may increase cooling of such area(s) by using a vehicle cooling unit, and/or may output a maintenance notification instructing the user to get such area(s) repaired.

In additional aspects, the system may be configured to determine if one or more delivery packages may be left in the refrigerated cargo zone when the delivery vehicle may have finished the delivery trip. The system may continue to operate the vehicle cooling unit when the system determines that a delivery package may be left in the refrigerated cargo zone. The system may further output a notification instructing the user to remove the delivery package. In addition, when the user desires to cool the refrigerated cargo zone for a predetermined time duration after the delivery vehicle finishes the delivery trip, the system may calculate an energy required to cool the refrigerated cargo zone for the predetermined time duration. The system may then compare the calculated energy with an energy level that may be present in the vehicle after the vehicle finishes the delivery trip. The system may output the charge notification instructing the user to charge/refill the vehicle when the energy level present in the vehicle may be less than the calculated energy.

The present disclosure discloses system and method to facilitate temperature management in a refrigerated delivery vehicle. The system outputs a charge notification instructing the user to charge/refill the vehicle when the system determines that the vehicle may not have enough energy to traverse the delivery trip. In this manner, the system prevents any inconvenience the user may experience when the vehicle may be in transit on the delivery trip. The system further outputs instructions facilitating the user to reduce user movement in the refrigerated cargo zone and/or the access door movement, thus ensuring that minimal cooling is lost during transit. The system further identifies areas in the refrigerated cargo zone that may have non-uniform temperatures, thus facilitating the user in repairing areas that may be causing loss of cooling in the refrigerated cargo zone.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a delivery vehicle 105 that may be a truck, a van (including walk-in vans), a truck trailer, and/or the like. The vehicle 105 may include any powertrain such as, for example, a gasoline engine, one or more electrically-actuated motor(s), a hybrid system, etc. The vehicle 105 may be a Battery Electric Vehicle (BEV) or an Internal Combustion Engine (ICE) vehicle. Furthermore, the vehicle 105 may be a manually driven vehicle and/or be configured and/or programmed to operate in a fully autonomous (e.g., driverless) mode (e.g., Level-5 autonomy) or in one or more partial autonomy modes which may include driver assist technologies.

In some aspects, the vehicle 105 may be a refrigerated cargo truck or a refrigerated tractor trailer that may include a refrigerated cargo zone 110. The vehicle 105 may be configured to transport perishable items such as food products, medicines, etc. by storing the items in the refrigerated cargo zone 110. Specifically, the refrigerated cargo zone 110 may be configured to store a plurality of delivery packages that may include the perishable items. The vehicle 105 may be configured to maintain a desired cool temperature in the refrigerated cargo zone 110 by using a vehicle cooling unit (not shown). The vehicle cooling unit may be a vehicle heating, ventilation, and air-conditioning (HVAC) system, a third party cooling system that may be installed in the vehicle 105, or a combination thereof.

The refrigerated cargo zone 110 may include an access door 115 using which a vehicle user (shown as user 210 in FIG. 2) may access the refrigerated cargo zone 110. Specifically, by opening the access door 115, the user may enter the refrigerated cargo zone 110 and may load/unload packages to/from the refrigerated cargo zone 110.

The vehicle 105 may include a temperature management system (shown as temperature management system 216 in FIG. 2) that may be configured to facilitate efficient management of temperature in the refrigerated cargo zone 110, so that the perishable items stored in the refrigerated cargo zone 110 do not perish. For example, in an exemplary aspect, before the vehicle 105 commences a delivery trip on a delivery route (e.g., a delivery route 120), the temperature management system ("system") may estimate whether the vehicle 105 has enough energy and/or fuel to traverse the entire delivery route, and maintain the desired cool temperature in the refrigerated cargo zone 110. Responsive to determining that the vehicle 105 may not have enough energy and/or fuel, the system may transmit a notification to a user device and/or a vehicle Human-Machine Interface instructing the user to charge the vehicle 105 (if the vehicle 105 is a BEV) or refill the fuel (if the vehicle 105 is an ICE vehicle).

In some aspects, to estimate whether the vehicle 105 has enough energy and/or fuel to traverse the delivery route, the system may obtain vehicle information, delivery route information, and delivery package information. The system may obtain the information described here from a vehicle memory (shown as memory 250 in FIG. 2), the user device, and/or one or more external server(s) (shown as servers 206 in FIG. 2). The vehicle information may include, but is not limited to, vehicle weight, refrigerated cargo zone size/dimensions, and/or the like. The delivery route information may include, but is not limited to, a delivery route or travel distance, locations of a plurality of waypoints on the delivery route 120, a desired refrigerated cargo zone temperature in the delivery route 120, ambient weather condition or solar energy/load information in the delivery route 120, estimated vehicle speed in the delivery route 120, and/or the like. The delivery package information may include, but is not limited to, a count of the plurality of delivery packages stored in the refrigerated cargo zone 110, a delivery schedule of each delivery package, weight, size and content of each delivery package, a storage location of each delivery package in the refrigerated cargo zone 110, specific temperature requirement (if any) for each delivery package, and/or the like. In some aspects, the system may obtain some information described above from historical vehicle usage information or pattern that may be stored in the vehicle memory.

Responsive to obtaining the vehicle information, the delivery route information, and the delivery package information, the system may estimate a driving energy required by the vehicle 105 to travel the delivery route 120, and a climate energy required by the vehicle 105 to maintain desired cool temperature in the refrigerated cargo zone 110 in the delivery route 120 based on the obtained information. The system may then calculate a total energy required by the vehicle 105 to traverse the delivery route 120 by adding the driving energy and the climate energy. The system may then compare the calculated total energy with a current energy that may be available in the vehicle 105 before the vehicle 105 commences the delivery trip. The system may output the notification (as described above) to charge/refill the vehicle 105 when the current energy is less than the calculated total energy. In some aspects, the system may calculate the total energy by adding a predefined buffer (e.g., 20%) to the sum of the driving energy and the climate energy, to ensure that the vehicle 105 has some energy available at the end of the delivery trip and/or to account for any unplanned instance (excess traffic or vehicle repair) that may be experienced by the vehicle 105 on the delivery route 120.

The system may be further configured to facilitate efficient management of temperature in the refrigerated cargo zone 110 when the vehicle 105 may be travelling on the delivery route 120. For example, the system may use vehicle sensors and/or cameras to detect user movement in the refrigerated cargo zone 110 when the user loads/unloads the delivery packages to/from the refrigerated cargo zone 110 when the vehicle 105 may be traversing on the delivery route 120. In addition, the system may use the vehicle sensors and/or the cameras to detect access door movement, e.g., a count of times the access door 115 may be opened by the user, a percentage of times the access door 115 may be fully opened by the user, a total time duration for which the access door 115 may be opened by the user over a predefined time duration on the delivery route 120, and/or the like. Responsive to detecting the user movement and/or the access door movement, the system may determine "user performance" in managing temperature in the refrigerated cargo zone 110 based on the detected user and access door movements. The system may output one or more recommendation notifications to facilitate the user in efficiently managing temperature in the refrigerated cargo zone 110 when the determined user performance may be less than a predetermined expected user performance (that may be pre-set by, e.g., a fleet operator). For example, the system may output a notification to the user to close the access door 115 when the system determines that the user may have kept the access door 115 open for a time duration longer than a permissible time duration. As another example, the system may output a notification to the user instructing the user to reduce the count of times the user opens the access door 115 during loading/unloading operation when the system determines that the user opens the access door 115 frequently.

In some aspects, the system may also transmit the determined user performance (or detected user movement and access door movement information) to an external server that may be managed by the fleet operator. The fleet operator may use the received information to determine training needs for the user. In other aspects, the fleet operator may also use the received information to provide rewards to the user, e.g., if the user efficiently manages temperature in the refrigerated cargo zone 110 by reducing access door movement over a predetermined time duration (e.g., over 1 month, 3 months, 6 months, etc.).

The system may be further configured to recommend adjustment of delivery package storage locations in the refrigerated cargo zone 110, based on the detected user movement, the access door movement and the delivery package information. For example, the system may recommend the user to move heavy delivery packages and/or packages with early delivery schedule to be placed in proximity to the access door 115, so that the user may limited user movement and access door movement during unloading operation of such packages.

The system may be additionally configured to detect areas within the refrigerated cargo zone 110 where the temperature may be non-uniform or more than the desired temperature by using the vehicle sensors and/or the cameras. The system may increase cooling of such areas by using the cooling unit and/or vehicle air conditioning vents, responsive to detecting such areas with non-uniform temperature. The system may also check historical recorded temperature at such areas (that may be stored in the vehicle memory), and may transmit a maintenance notification to the user device and/or the vehicle HMI when the historical recorded temperature indicates that temperature may be historically non-uniform in such areas. The user may then get such areas checked for any refrigeration leaks or similar faults, responsive to receiving the maintenance notification.

In further aspects, when the vehicle 105 completes the delivery trip (e.g., by traversing the delivery route 120), the system may be configured to detect whether any delivery package may be left in the refrigerated cargo zone 110 by using the vehicle sensors and/or the cameras. Responsive to detecting that a delivery package may be left in the refrigerated cargo zone 110, the system may keep the cooling unit switched ON and may transmit an alert notification to the user instructing the user to remove the delivery package from the refrigerated cargo zone 110.

Figure 2:
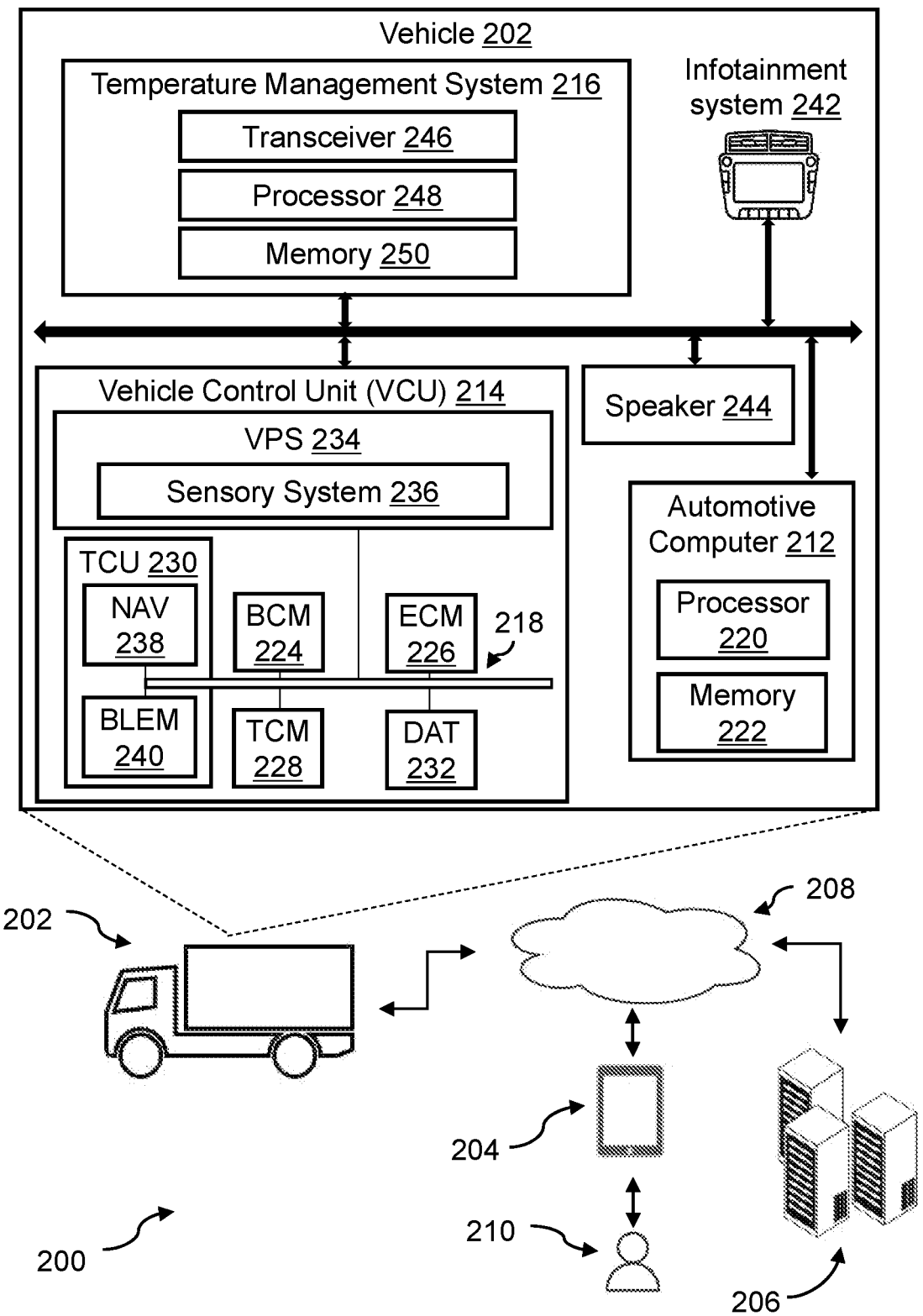
FIG. 2 depicts a block diagram of an example system to facilitate temperature management in a refrigerated delivery vehicle in accordance with the present disclosure.

These and other operations performed by the system are described in detail in conjunction with FIG. 2.

The vehicle 105, the user and/or the system implements and/or performs operations, as described here in the present disclosure, in accordance with the owner manual and safety guidelines.

FIG. 2 depicts a block diagram of an example system 200 to facilitate temperature management in a refrigerated delivery vehicle 202 in accordance with the present disclosure. While describing FIG. 2, references may be made to FIG. 3.

The system 200 may include the vehicle 202, a user device 204, and one or more servers 206 communicatively coupled with each other via one or more networks 208. The vehicle 202 may be same as the vehicle 105 described in conjunction with FIG. 1. The user device 204 may be associated with a vehicle operator or user 210. The user device 204 may be, for example, a mobile phone, a laptop, a computer, a tablet, a wearable device, or any other similar device with communication capabilities. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In this case, a vehicle fleet operator (not shown) may operate the server(s) 206. In additional aspects, the server(s) 206 may store vehicle information associated with the vehicle 202, the delivery route information associated with the delivery route 120, and delivery package information associated with the plurality of packages that may be stored in the refrigerated cargo zone 110. The server(s) 206 may be configured to transmit the vehicle information, the delivery route information, and the delivery package information to the vehicle 202, via the network(s) 208, at a predefined frequency or at the start of a delivery trip of the vehicle 202. Examples of the vehicle information, the delivery route information and the delivery package information are already described above in conjunction with FIG. 1.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 212, a Vehicle Control Unit (VCU) 214, and a temperature management system 216. The VCU 214 may include a plurality of Electronic Control Units (ECUs) 218 disposed in communication with the automotive computer 212.

The user device 204 may connect with the automotive computer 212 and/or the temperature management system 216 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 212 and/or the temperature management system 216 may be installed in a vehicle engine compartment (or elsewhere in the vehicle 202), in accordance with the disclosure. Further, the automotive computer 212 may operate as a functional part of the temperature management system 216. The automotive computer 212 may be or include an electronic vehicle controller, having one or more processor(s) 220 and a memory 222. Moreover, the temperature management system 216 may be separate from the automotive computer 212 (as shown in FIG. 2) or may be integrated as part of the automotive computer 212.

The processor(s) 220 may be disposed in communication with one or more memory devices disposed in communication with the respective computing systems (e.g., the memory 222 and/or one or more external databases not shown in FIG. 2). The processor(s) 220 may utilize the memory 222 to store programs in code and/or to store data for performing aspects in accordance with the disclosure. The memory 222 may be a non-transitory computer-readable memory storing a temperature management program code. The memory 222 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 214 may share a power bus with the automotive computer 212 and may be configured and/or programmed to coordinate the data between vehicle 202 systems, connected servers (e.g., the server(s) 206), and other vehicles (not shown in FIG. 2) operating as part of a vehicle fleet. The VCU 214 can include or communicate with any combination of the ECUs 218, such as, for example, a Body Control Module (BCM) 224, an Engine Control Module (ECM) 226, a Transmission Control Module (TCM) 228, a telematics control unit (TCU) 230, a Driver Assistances Technologies (DAT) controller 232, etc. The VCU 214 may further include and/or communicate with a Vehicle Perception System (VPS) 234, having connectivity with and/or control of one or more vehicle sensory system(s) 236 (or a "detection unit"). The vehicle sensory system 236/detection unit may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door position sensors, proximity sensors, temperature sensors, wheel sensors, weight sensors, ambient weather sensors, vehicle interior and exterior cameras, infrared cameras, etc. In some aspects, the door position sensors may be configured to determine position of the access door 115 (e.g., whether the access door 115 is closed, partially open or fully open). The infrared cameras and/or the temperature sensors may be configured to determine real-time temperature in various areas/portions of the refrigerated cargo zone 110. Specifically, the refrigerated cargo zone 110 may include a plurality of cargo zone areas (shown as cargo zone areas 305a-n in FIG. 3), and the infrared cameras and/or the temperature sensors may be configured to determine real-time temperature in each cargo zone area when the vehicle 202 travels on the delivery route 120.

In some aspects, the VCU 214 may control vehicle operational aspects and implement one or more instruction sets received from the user device 204, from one or more instruction sets stored in the memory 222, including instructions operational as part of the temperature management system 216.

The TCU 230 can be configured and/or programmed to provide vehicle connectivity to wireless computing systems onboard and off board the vehicle 202, and may include a Navigation (NAV) receiver 238 for receiving and processing a GPS signal, a BLE® Module (BLEM) 240, a Wi-Fi transceiver, a UWB transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 230 may additionally have cellular communication capabilities that may enable the TCU 230 to communicatively couple with one or more external devices. The TCU 230 may be disposed in communication with the ECUs 218 by way of a bus.

The ECUs 218 may control aspects of vehicle operation and communication using inputs from human drivers, inputs from an autonomous vehicle controller, the temperature management system 216, and/or via wireless signal inputs received via the wireless connection(s) from other connected devices, such as the user device 204, the server(s) 206, among others.

The BCM 224 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, door locks and access control, and various comfort controls. The BCM 224 may also operate as a gateway for bus and network interfaces to interact with remote ECUs (not shown in FIG. 2). In some aspects, the BCM 224 may be additionally configured to control operation of a vehicle cooling unit (not shown) that may cool the plurality of cargo zone areas 305a-n in the refrigerated cargo zone 110. The vehicle cooling unit may include an external (e.g., a third-party) refrigeration system that may be installed in the vehicle 202 and/or the vehicle HVAC system, and a plurality of vents that may cool the plurality of cargo zone areas 305a-n to a temperature desired (e.g., the desired refrigerated cargo zone temperature) and pre-set by the user 210 or the fleet operator.

The DAT controller 232 may provide Level-1 through Level-3 automated driving and driver assistance functionality that can include, for example, active parking assistance, vehicle backup assistance, adaptive cruise control, and/or lane keeping, among other features. The DAT controller 232 may also provide aspects of user and environmental inputs usable for user authentication.

In some aspects, the automotive computer 212 may connect with an infotainment system 242 and a speaker 244. The automotive computer 212 and/or the temperature management system 216 may control operation of the speaker 244 via the BCM 224. The infotainment system 242 may include a touchscreen interface portion, and may include voice recognition features, biometric identification capabilities that can identify users based on facial recognition, voice recognition, fingerprint identification, or other biological identification means. In other aspects, the infotainment system 242 may be further configured to receive user instructions via the touchscreen interface portion, and/or display notifications, navigation maps, etc. on the touchscreen interface portion.

The computing system architecture of the automotive computer 212, the VCU 214, and/or the temperature management system 216 may omit certain computing modules. It should be readily understood that the computing environment depicted in FIG. 2 is an example of a possible implementation according to the present disclosure, and thus, it should not be considered limiting or exclusive.

In accordance with some aspects, the temperature management system 216 may be integrated with and/or executed as part of the ECUs 218. The temperature management system 216, regardless of whether it is integrated with the automotive computer 212 or the ECUs 218, or whether it operates as an independent computing system in the vehicle 202, may include a transceiver 246, a processor 248, and a computer-readable memory 250.

The transceiver 246 may be configured to receive information/inputs from one or more external devices or systems, e.g., the user device 204, the server(s) 206, and/or the like via the network 208. Further, the transceiver 246 may transmit notifications (e.g., alert/alarm signals) to the external devices or systems. In addition, the transceiver 246 may be configured to receive information/inputs from vehicle 202 components such as the infotainment system 242, the sensory system 236, and/or the like. Further, the transceiver 246 may transmit notifications (e.g., alert/alarm signals) to the vehicle 202 components such as the infotainment system 242, the speaker 244, etc.

The processor 248 and the memory 250 may be same as or similar to the processor 220 and the memory 222, respectively. Specifically, the processor 248 may utilize the memory 250 to store programs in code and/or to store data for performing aspects in accordance with the disclosure. The memory 250 may be a non-transitory computer-readable memory storing the temperature management code. In some aspects, the memory 250 may additionally store the vehicle information, the delivery route information, and the delivery package information described above in conjunction with FIG. 1. The memory 250 may be additionally configured to store historical vehicle usage information and/or historical user movement information associated with historical movement patterns of the user 210 in the refrigerated cargo zone 110 (or another cargo zone of a different vehicle). The memory 250 may receive (and aggregate) the historical vehicle usage information and/or the historical user movement information from the server(s) 206 and/or the VCU 214. In some aspects, the historical vehicle usage information may include information associated with historical delivery routes traversed by the vehicle 202, average distance travelled per delivery route, historical waypoints on the delivery routes, weight/size/dimensions of delivery packages historically delivered by the vehicle 202, average vehicle speeds on the delivery routes, historical vehicle energy consumption pattern on the delivery routes, and/or the like. The historical user movement information may include information associated with typical pattern of user movement in the refrigerated cargo zone 110 to move delivery packages from the plurality of cargo zone areas 305a-n to the access door 115, historical count of times the user 210 opened the access door 115 per delivery trip, historical time durations for which the user 210 opened the access door 115 per delivery trip, historical percentage of times the user 210 fully opened the access door 115 per delivery trip, average time duration per delivery trip the user 210 moves in the refrigerated cargo zone 110, and/or the like.

In operation, the transceiver 246 may receive the vehicle information, the delivery route information, and the delivery package information from the server 206 and/or the user device 204 via the network 208. The transceiver 246 may additionally receive some part of the vehicle information from the VCU 214. In some aspects, the transceiver 246 may receive the vehicle information, the delivery route information, and the delivery package information a predefined time duration (e.g., 15 minutes or 30 minutes) before the vehicle 202 commences a delivery trip. The transceiver 246 may send the received information to the memory 250 for storage purpose.

The processor 248 may obtain the vehicle information, the delivery route information, and the delivery package information from the memory 250. The processor 248 may further obtain the historical vehicle usage information and the historical user movement information from the memory 250. Responsive to obtaining the information, the processor 248 may estimate the driving energy required by the vehicle 202 to travel the delivery route 120 and the climate energy required by the vehicle 202 to cool the refrigerated cargo zone 110 in the delivery route 120 based on the obtained information, as described above in conjunction with FIG. 1. The processor 248 may further calculate a total required energy by adding the driving energy and the climate energy, and adding a buffer energy (e.g., 10-20% of the sum of the driving energy and the climate energy). Responsive to calculating the total required energy, the processor 248 may obtain a current vehicle battery state of charge (SOC) level (if the vehicle 202 is a BEV) or a fuel level (if the vehicle 202 is an ICE vehicle) from the VCU 214. Stated another way, the processor 248 may obtain a current vehicle energy level available in the vehicle 202 before the vehicle 202 commences the delivery trip, responsive to calculating the total required energy. The processor 248 may then compare the total required energy with the current vehicle energy level. The processor 248 may output a vehicle charge notification, via the transceiver 246, instructing the user 210 to charge or refill the vehicle 202 when the current vehicle energy level may be less than the total required energy. The processor 248 may output the vehicle charge notification via the user device 204, the server(s) 206, the infotainment system 242 and/or the speaker 244.

Figure 3:
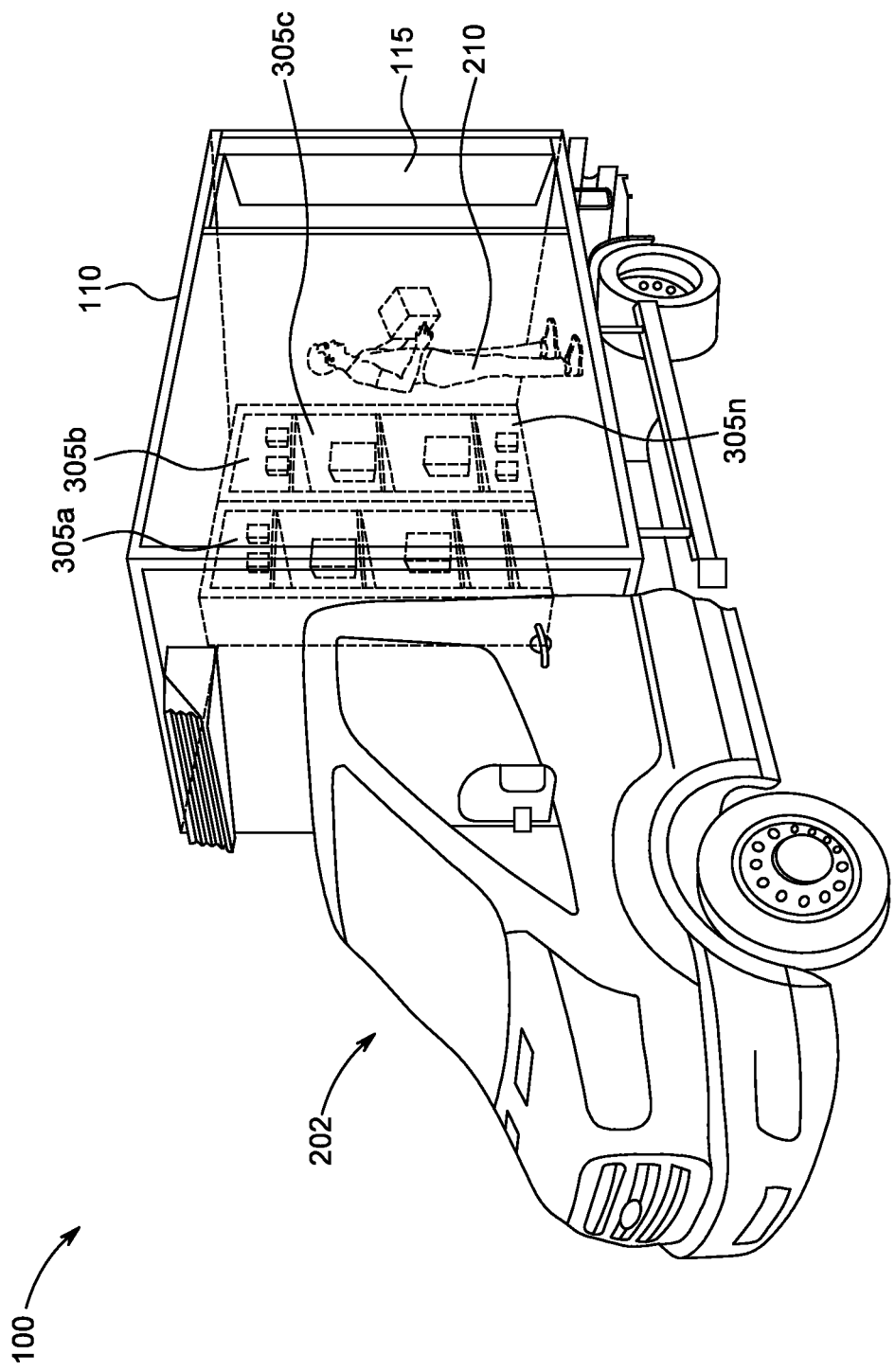
FIG. 3 depicts example cargo zone areas in a refrigerated cargo zone of a refrigerated delivery vehicle in accordance with the present disclosure.

The vehicle 202 may commence the delivery trip when the user 210 charges/refills the vehicle 202, or when the current vehicle energy level may be equivalent to or greater than the total required energy. When the vehicle 202 may be travelling on/traversing the delivery route 120 or when the vehicle 202 may be parked on the delivery route 120, the processor 248 may obtain the real-time temperature in each cargo zone area of the refrigerated cargo zone 110 from the sensory system(s) 236. An exemplary interior view of the refrigerated cargo zone 110 including a plurality of cargo zone areas 305a, 305b, 305c, 305n (cargo zone areas 305a-n) is shown in FIG. 3. The sensory system(s) 236 may be configured to determine the real-time temperature in each cargo zone area 305a-n, and may transmit the determined real-time temperature to the processor 248 at a predefined frequency (e.g., every 5 or 10 seconds) when the vehicle 202 may be travelling on the delivery route 120.

Responsive to obtaining the real-time temperature, the processor 248 may compare the real-time temperature for each cargo zone area 305a-n with the desired refrigerated cargo zone temperature (that may be part of the delivery route information, as described above). The processor 248 may determine that a specific cargo zone area (e.g., the cargo zone area 305a) may have non-uniform temperature when the real-time temperature at the cargo zone area 305a may be more (or less) than the desired refrigerated cargo zone temperature. Responsive to determining that the cargo zone area 305a may have non-uniform temperature, the processor 248 may send a command to the BCM 224 to cause the vehicle cooling unit to increase or activate cooling at the cargo zone area 305a. In some aspects, each cargo zone area 305a-n may have a different associated desired temperature. In this case, the processor 248 may compare the real-time temperature at the cargo zone area 305a with the associated desired temperature to determine that the cargo zone area 305a may have non-uniform temperature.

In further aspects, responsive to determining that the cargo zone area 305a may have non-uniform temperature, the processor 248 may obtain historical temperature values/information for the cargo zone area 305a (that may be stored in the memory 250) from the memory 250. The processor 248 may then determine whether the cargo zone area 305a historically has non-uniform temperature based on the obtained historical temperature information. Stated another way, based on the historical temperature information, the processor 248 may determine if one or more historical temperature values associated with the cargo zone area 305a may be greater (or less) than the desired refrigerated cargo zone temperature. Responsive to determining that the cargo zone area 305a may historically have non-uniform temperature, the processor 248 may output, via the transceiver 246, a maintenance notification indicating that the cargo zone area 305a may require repair or maintenance. In some aspects, the processor 248 may output the maintenance notification via the user device 204, the server(s) 206, the infotainment system 242 and/or the speaker 244. Responsive to receiving/hearing the maintenance notification, the user 210 may check whether there may be leakage or any other fault in the cargo zone area 305a.

In further aspects, when the vehicle 202 may be travelling on/traversing the delivery route 120 or when the vehicle 202 may be parked on the delivery route 120, the processor 248 may obtain inputs associated with the user movement in the refrigerated cargo zone 110 and the access door movement from the sensory system(s) 236 over a predefined time duration (e.g., a time duration for which the vehicle 202 may be travelling on the delivery route 120). Specifically, the processor 248 may obtain inputs associated with the user movement in the refrigerated cargo zone 110 from vehicle radar sensors and/or vehicle interior cameras. The inputs for the user movement may include information associated with a count of times the user 210 has entered the refrigerated cargo zone 110, a count of times the user 210 has moved from each cargo zone area 305a-n to the access door 115, a total time duration the user 210 has spent in the refrigerated cargo zone 110, and/or the like. Similarly, the processor 248 may obtain inputs associated with the access door movement from the vehicle interior cameras and/or the door position sensors. The inputs for the access door movement may include information associated with a count of times the access door 115 may be opened by the user 210, a percentage of times the access door 115 may be fully opened by the user 210, a total time duration for which the access door 115 may be opened by the user 210, and/or the like.

Responsive to obtaining the inputs associated with the user movement and the access door movement over the predefined time duration, the processor 248 may determine a user inefficiency parameter or a user behavior parameter based on the obtained inputs. The user inefficiency parameter may be associated with user behavior in the refrigerated cargo zone 110 that may affect temperature in the refrigerated cargo zone 110. For example, the user inefficiency parameter may be associated with a time duration the user 210 spends in the refrigerated cargo zone 110 leaving the access door 115 open (as shown in FIG. 3), which may result in increase of temperature or loss of cooling in the refrigerated cargo zone 110. As another example, the user inefficiency parameter may be associated with the total time duration the user 210 has spent in the refrigerated cargo zone 110, resulting in increase of thermal mass in the refrigerated cargo zone 110. A person ordinarily skilled in the art may appreciate that if the user 210 spends considerable time duration in the refrigerated cargo zone 110 (in addition to leaving the access door 115 open), the vehicle cooling unit may be required to expend excess energy to decrease the temperature back to the desired temperature value (i.e., cool the refrigerated cargo zone 110). Therefore, an efficient user may spend less time in the refrigerated cargo zone 110 and may keep the access door 115 closed (as much as possible) during delivery package loading/unloading process.

In an exemplary aspect, the user inefficiency parameter may be a linear average or a weighted average of the count of times the access door 115 may be opened by the user 210, the percentage of times the access door 115 may be fully opened by the user 210, the total time duration for which the access door 115 may be opened by the user 210, the count of times the user 210 has entered the refrigerated cargo zone 110, the count of times the user 210 has moved from each cargo zone area 305a-n to the access door 115, and the total time duration the user 210 has spent in the refrigerated cargo zone 110. In other aspects, each aspect/information described above (e.g., the count of times the access door 115 may be opened, the percentage of times the access door 115 may be fully opened, etc.) may be associated with a different user inefficiency parameter.

Responsive to determining the user inefficiency parameter, the processor 248 may fetch a threshold inefficiency parameter from the server 206 or the memory 250 (that may pre-store in the memory 250). In some aspects, the threshold inefficiency parameter may be associated with an expected or minimum user performance or user behavior in the refrigerated cargo zone 110 that may be pre-set by the fleet operator. As an example, the threshold inefficiency parameter may be associated with a threshold (or expected) count of times the access door 115 may be opened by the user 210, a threshold percentage of times the access door 115 may be fully opened by the user 210, a threshold total time duration for which the access door 115 may be opened by the user 210, a threshold count of times the user 210 may enter the refrigerated cargo zone 110, a threshold count of times the user 210 may move from each cargo zone area 305a-n to the access door 115, a threshold total time duration the user 210 may spend in the refrigerated cargo zone 110, and/or the like. In some aspects, the threshold inefficiency parameter too may be linear average or weightage average of the information described above. In other aspects, each aspect/information described above may be associated with a different threshold inefficiency parameter.

Responsive to fetching the threshold inefficiency parameter, the processor 248 may compare the user inefficiency parameter with the threshold inefficiency parameter. The processor 248 may output a first notification (e.g., a user performance enhancement notification), via the transceiver 246, when the user inefficiency parameter may be greater than the threshold inefficiency parameter. For example, the processor 248 may output the first notification when the user 210 may be opening the access door 115 for more times on the delivery route 120 than an expected count of times, or when the user 210 may be spending more time duration in the refrigerated cargo zone 110 than an expected time duration. The processor 248 may output the first notification via the user device 204, the infotainment system 242, the speaker 244 and/or the server(s) 206.

In some aspects, the first notification may include instructions for the user 210 to reduce the user movement in the refrigerated cargo zone 110 and/or reduce the access door movement. The user 210 may receive/hear the first notification, and may reduce user movement and/or access door movement, thus facilitating in efficiently managing temperature in the refrigerated cargo zone 110. In additional aspects, the processor 248 may output the first notification based on the historical user movement information that the processor 248 obtains from the memory 250 (as described above). In this case, the first notification may include instructions based on the historical user movement pattern/information. For example, if the historical user movement information indicates that the user 210 historically or typically keeps the access door 115 open for a substantial time duration while loading/unloading delivery packages, the first notification may specifically include instructions to close the access door 115 when the user 210 loads or unloads the delivery packages.

In further aspects, the fleet operator may use the first notification received at the server(s) 206 to plan training needs for the user 210. In yet another aspect, the fleet operator may plan rewards for the user 210 based on the first notification, as described above in conjunction with FIG. 1.

In further aspects, in addition to determining the user inefficiency parameter, the processor 248 may determine that the access door 115 may be opened (and kept in open state) by the user 210 for a time duration greater than a permissible time duration, based on the obtained access door movement. For example, the processor 248 may determine that the user 210 may have kept the access door 115 open for more than 45 seconds or 60 seconds continuously. Responsive to determining that the user 210 may have kept the access door 115 open for a time duration greater than the permissible time duration, the processor 248 may output a second notification in real-time, via the transceiver 246, instructing the user 210 to close the access door 115. The processor 248 may output the second notification via the infotainment system 242, the speaker 244 and/or the user device 204. In yet another aspect, the processor 248 may output the second notification when the processor 248 determines, via the sensory system 236, that the user 210 may have kept the access door 115 open and may have left the vehicle 202 or the refrigerated cargo zone 110. In this case, the second notification may include instructions for the user 210 to return to the vehicle 202 or the refrigerated cargo zone 110, and close the access door 115.

In yet another aspect, when the vehicle 202 may be traversing the delivery route 120, the processor 248 may determine an expected user movement time duration required by the user 210 to move each delivery package from respective storage location to the access door 115 during package unloading operation, based on the delivery package information, the user movement and the historical user movement pattern/information. Responsive to determining the expected user movement time duration, the processor 248 may output a third notification (via the transceiver 246 and the user device 204/speaker 244) that may include instructions to facilitate the user 210 to reduce the time duration that the user 210 may spend in the refrigerated cargo zone 110 during the package unloading operation. For example, the processor 248 may output the third notification instructing the user 210 to move (or adjust storage location of) a heavy delivery package closer to the access door 115, when the processor 248 determines that the user 210 may spend substantial time duration (e.g., more than a predefined time duration) to move the heavy delivery package from a current storage location to the access door 115. In this manner, the processor 248 may facilitate the user 210 in reducing time duration that the user 210 may spend in the refrigerated cargo zone 110 (by adjusting delivery package storage locations) while the vehicle 202 may be in transit on the delivery route 120.

In additional aspects, the processor 248 may determine when the vehicle 202 may finish traversing the delivery route 120 based on the delivery route information and inputs received from the TCU 230. Responsive to determining that the vehicle 202 may have traversed the delivery route 120, the processor 248 may determine if one or more delivery packages may be left behind in the refrigerated cargo zone 110 based on inputs received from the sensory system 236 (e.g., vehicle interior cameras). Responsive to determining that a delivery package may be left behind, the processor 248 may output a fourth notification, via the transceiver 246 and the user device 204/speaker 244, instructing the user 210 to remove the delivery package. In addition, the processor 248 may send a command signal to the BCM 224 to keep the vehicle cooling unit switched ON or operational till the user 210 removes the delivery package from the refrigerated cargo zone 110. In some aspects, the processor 248 may cause the vehicle cooling unit to switch OFF when the processor 248 obtains a request from the user 210 (via the user device 204 or the infotainment system 242, and the transceiver 246) to switch OFF the vehicle cooling unit.

In additional aspects, the processor 248 may keep the vehicle cooling unit switched ON after the vehicle 202 has traversed the delivery route 120 (even after all the delivery packages are removed from the refrigerated cargo zone 110), based on an input obtained from the user 210 via the user device 204 or the infotainment system 242, and the transceiver 246. For example, the user 210 may transmit inputs to the processor 248 to keep the vehicle cooling unit operational/switched ON for two hours after the vehicle 202 has traversed the delivery route 120. In this case, the processor 248 may calculate an energy required by the vehicle 202 to keep the vehicle cooling unit operational for two hours at the desired refrigerated cargo zone temperature, based on the vehicle information. Responsive to calculating the required energy, the processor 248 may fetch a vehicle current charge/fuel level from the VCU 214. The processor 248 may then compare the required energy with the current charge/fuel level. The processor 248 may output a fifth notification to charge/refill the vehicle 202 when the current charge/fuel level may be less than the required energy. In this case, the required energy may include some buffer charge/fuel level, to ensure that the vehicle 202 has energy left at the end of the two hour time duration (when the vehicle cooling unit may be switched OFF).

Figure 4:
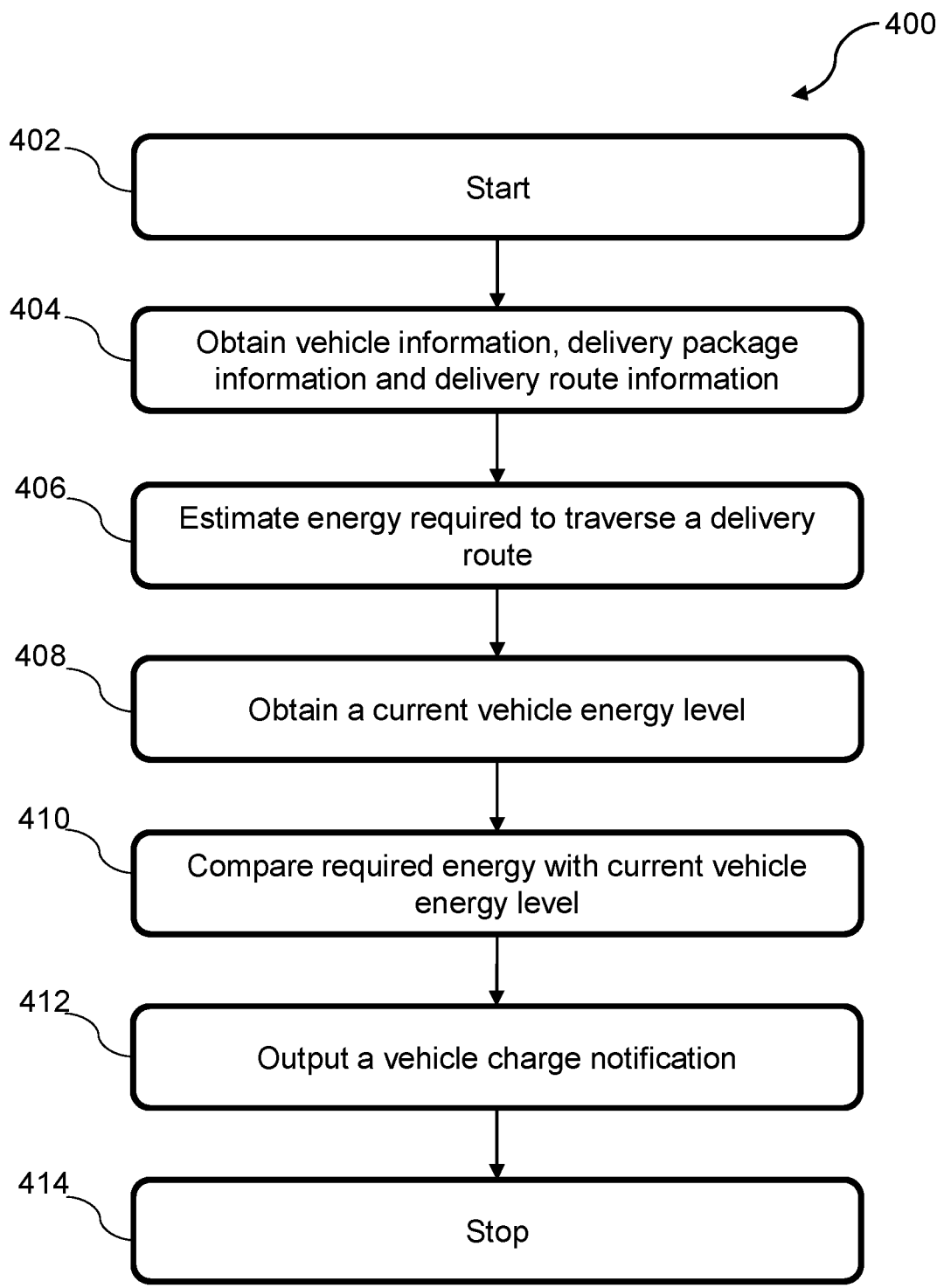
FIG. 4 depicts a flow diagram of an example first method to facilitate temperature management in a refrigerated delivery vehicle in accordance with the present disclosure.

FIG. 4 depicts a flow diagram of an example first method 400 to facilitate temperature management in the vehicle 202 in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

The method 400 starts at step 402. At step 404, the method 400 may include obtaining, by the processor 248, the vehicle information, the delivery package information, and the delivery route information. As described above, the processor 248 may obtain the information described here before the vehicle commences the delivery trip.

At step 406, the method 400 may include estimating, by the processor 248, an energy required by the vehicle 202 to traverse the delivery route 120 based on the obtained information. As described above, the required energy may be the sum of the driving energy, the climate energy, and a buffer energy. At step 408, the method 400 may include obtaining, by the processor 248, a current vehicle energy level via the VCU 214. At step 410, the method 400 may include comparing, by the processor 248, the required energy with the current vehicle energy level. At step 412, the method 400 may include outputting, by the processor 249, a vehicle charge notification instructing the user 210 to charge/refill the vehicle 202 when the current vehicle energy level may be less than the required energy.

The method 400 may end at step 414.

Figure 5:
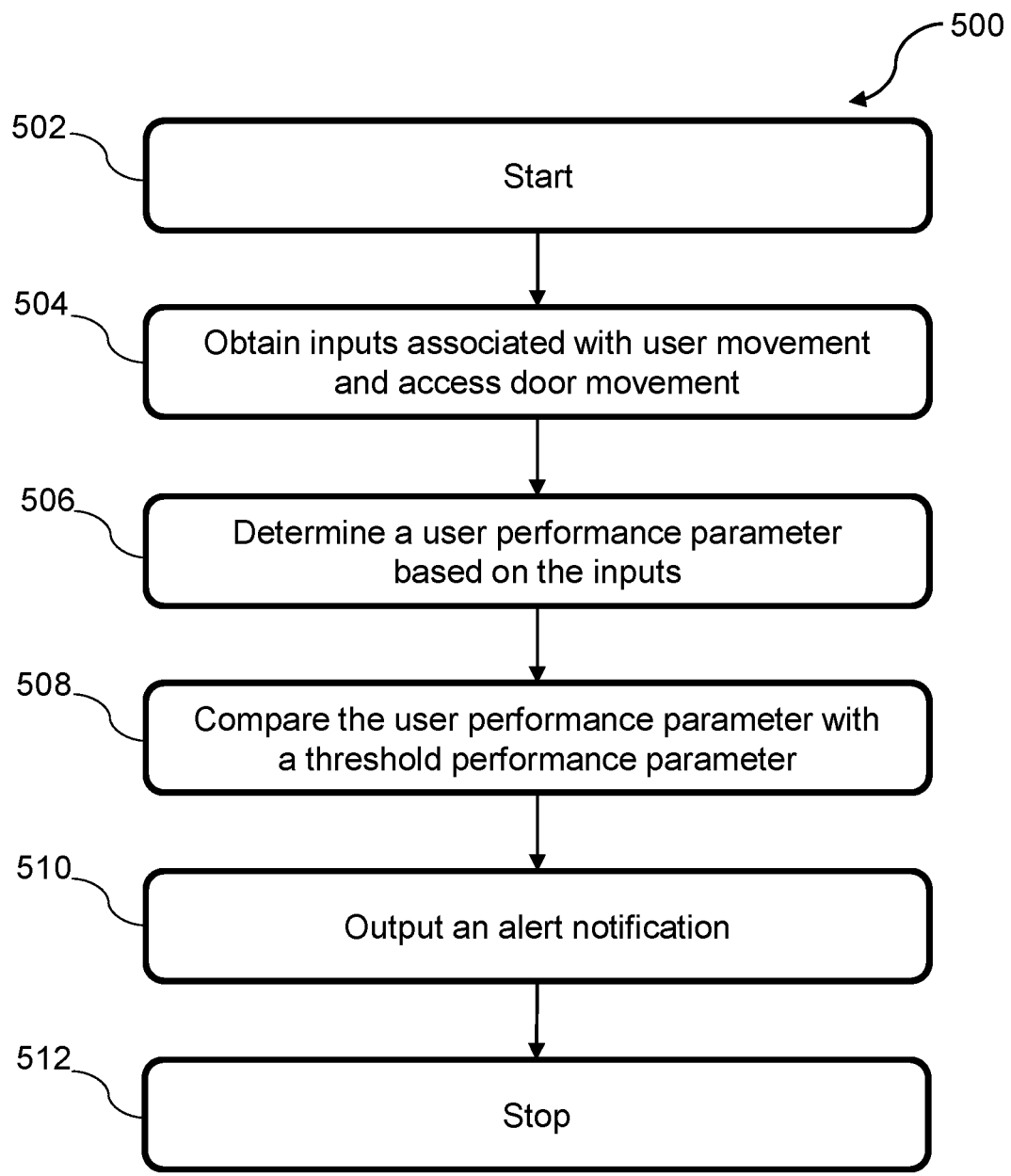
FIG. 5 depicts a flow diagram of an example second method to facilitate temperature management in a refrigerated delivery vehicle in accordance with the present disclosure.

FIG. 5 depicts a flow diagram of an example second method 500 to facilitate temperature management in the vehicle 202 in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

The method 500 starts at step 502. At step 504, the method 500 may include obtaining, by the processor 248, inputs associated with the user movement in the refrigerated cargo zone 110 and the access door movement from the sensory system 236. At step 506, the method 500 may include determining, by the processor 248, the user inefficiency parameter based on the inputs obtained from the sensory system 236. At step 508, the method 500 may include comparing, by the processor 248, the user inefficiency parameter with the threshold inefficiency parameter.

At step 510, the method 500 may include outputting, by the processor 248, an alert notification when the user inefficiency parameter may be greater than the threshold inefficiency parameter. As described above, the alert notification may include instructions for the user 210 to reduce the user movement and/or the access door movement.

The method 500 may end at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
    a refrigerated cargo zone configured to store a plurality of delivery packages, wherein the refrigerated cargo zone comprises an access door;
    a detection unit configured to detect a user movement in the refrigerated cargo zone and an access door movement when the vehicle is traversing a delivery route; and
    a processor communicatively coupled with the detection unit, wherein the processor is configured to:
        obtain inputs associated with the user movement and the access door movement from the detection unit;
        determine a user inefficiency parameter based on the inputs;
        compare the user inefficiency parameter with a threshold inefficiency parameter; and
        output a first notification when the user inefficiency parameter is greater than the threshold inefficiency parameter.

2. The vehicle of claim 1, wherein the user inefficiency parameter is associated with at least one of: a count of times the access door is opened by a user in a predefined time duration, a percentage of times the access door is fully opened by the user in the predefined time duration, a total time duration for which the access door is opened by the user in the predefined time duration.

3. The vehicle of claim 2, wherein the user inefficiency parameter is greater than the threshold inefficiency parameter when the count of times exceeds a threshold count of times, the percentage of times the access door is fully opened exceeds a threshold percentage, or the total time duration for which the access door is opened exceeds a threshold total time duration.

4. The vehicle of claim 1, wherein the processor is further configured to:
    determine that the access door is open for a time duration greater than a predefined permissible time duration based on the inputs obtained from the detection unit; and
    output a second notification responsive to a determination that the access door is open for the time duration greater than the predefined permissible time duration, wherein the second notification comprises instructions to close the access door.

5. The vehicle of claim 1, wherein the refrigerated cargo zone comprises a plurality of cargo zone areas, and wherein the detection unit is further configured to detect a real-time temperature in each cargo zone area.

6. The vehicle of claim 5, wherein the processor is further configured to:
    compare the real-time temperature in a cargo zone area of the plurality of cargo zone areas with a preset temperature; and
    activate a vehicle cooling unit to cool the cargo zone area when the real-time temperature in the cargo zone area is greater than the preset temperature.

7. The vehicle of claim 6, wherein the processor is further configured to:
    obtain historical temperature information associated with the cargo zone area;
    determine that a historical temperature associated with the cargo zone area is greater than the preset temperature, based on the historical temperature information; and
    output a maintenance notification responsive to a determination that the historical temperature associated with the cargo zone area is greater than the preset temperature.

8. The vehicle of claim 1, wherein the detection unit is further configured to detect a delivery package presence in the refrigerated cargo zone, and wherein the processor is further configured to:
    obtain inputs from a vehicle telematics control unit;
    determine that the vehicle has traversed the delivery route using the inputs obtained from the vehicle telematics control unit;
    determine that a delivery package is disposed in the refrigerated cargo zone based on the inputs obtained from the detection unit when the vehicle has traversed the delivery route; and
    output an alert notification comprising instructions to remove the delivery package from the refrigerated cargo zone based on a determination that the delivery package is disposed in the refrigerated cargo zone.

9. The vehicle of claim 1 further comprising a memory configured to store delivery package information, wherein the delivery package information comprises a count of the plurality of delivery packages stored in the refrigerated cargo zone, a delivery schedule of each delivery package, weight, size and content of each delivery package, and a storage location of each delivery package in the refrigerated cargo zone.

10. The vehicle of claim 9, wherein the processor is further configured to:
    obtain the delivery package information from the memory; and
    determine an expected movement time duration required by a user to move each delivery package from respective storage location to the access door, based on the delivery package information and the user movement in the refrigerated cargo zone,
    wherein the first notification comprises instructions to adjust a storage location of a delivery package when respective expected movement time duration associated with the delivery package exceeds a predefined threshold.

11. The vehicle of claim 9 further comprising a transceiver configured to receive delivery route information from a user device or a server, wherein the delivery route information comprises a route distance, locations of a plurality of waypoints on the delivery route, desired refrigerated cargo zone temperature in the delivery route, and ambient weather condition information in the delivery route.

12. The vehicle of claim 11, wherein the processor is further configured to:
obtain the delivery package information from the memory and the delivery route information from the transceiver;
estimate an energy required by the vehicle to traverse the delivery route based on the delivery package information and the delivery route information;
obtain a current vehicle energy level;
compare the estimated energy with the current vehicle energy level; and
output a vehicle charge notification when the current vehicle energy level is less than the estimated energy.

13. A method to facilitate temperature management in a vehicle, the method comprising:
obtaining, by a processor, inputs associated with a user movement and an access door movement from a detection unit of the vehicle, wherein:
the detection unit is configured to detect the user movement in a refrigerated cargo zone of the vehicle and the access door movement when the vehicle is traversing a delivery route,
the refrigerated cargo zone is configured to store a plurality of delivery packages, and
the refrigerated cargo zone comprises an access door;
determining, by the processor, a user inefficiency parameter based on the inputs;
comparing, by the processor, the user inefficiency parameter with a threshold inefficiency parameter; and
outputting, by the processor, a notification when the user inefficiency parameter is greater than the threshold inefficiency parameter.

14. The method of claim 13, wherein the user inefficiency parameter is associated with at least one of: a count of times the access door is opened by a user in a predefined time duration, a percentage of times the access door is fully opened by the user in the predefined time duration, a total time duration for which the access door is opened by the user in the predefined time duration.

15. The method of claim 14, wherein the user inefficiency parameter is greater than the threshold inefficiency parameter when the count of times exceeds a threshold count of times, the percentage of times the access door is fully opened exceeds a threshold percentage, or the total time duration for which the access door is opened exceeds a threshold total time duration.

16. The method of claim 13, wherein the refrigerated cargo zone comprises a plurality of cargo zone areas, and wherein the detection unit is further configured to detect a real-time temperature in each cargo zone area and a delivery package presence in the refrigerated cargo zone.

17. The method of claim 16 further comprising:
comparing the real-time temperature in a cargo zone area of the plurality of cargo zone areas with a preset temperature; and
activating a vehicle cooling unit to cool the cargo zone area when the real-time temperature in the cargo zone area is greater than the preset temperature.

18. The method of claim 17 further comprising:
obtaining historical temperature information associated with the cargo zone area;
determining that a historical temperature associated with the cargo zone area is greater than the preset temperature, based on the historical temperature information; and
outputting a maintenance notification responsive to a determination that the historical temperature associated with the cargo zone area is greater than the preset temperature.

19. The method of claim 16 further comprising:
obtaining inputs from a vehicle telematics control unit;
determining that the vehicle has traversed the delivery route using the inputs obtained from the vehicle telematics control unit;
determining that a delivery package is disposed in the refrigerated cargo zone based on the inputs obtained from the detection unit when the vehicle has traversed the delivery route; and
outputting an alert notification comprising instructions to remove the delivery package from the refrigerated cargo zone based on a determination that the delivery package is disposed in the refrigerated cargo zone.

* * * * *